US009796066B2

(12) United States Patent
Elfizy et al.

(10) Patent No.: US 9,796,066 B2
(45) Date of Patent: Oct. 24, 2017

(54) GRINDING WHEEL AND METHOD

(71) Applicant: Pratt & Whitney Canada Corp., Longueuil (CA)

(72) Inventors: Amr Elfizy, Longueuil (CA); François Perron, Laval (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 0 days.

(21) Appl. No.: 15/045,406

(22) Filed: Feb. 17, 2016

(65) Prior Publication Data

US 2016/0158913 A1    Jun. 9, 2016

Related U.S. Application Data

(62) Division of application No. 14/159,121, filed on Jan. 20, 2014, now Pat. No. 9,302,369.

(51) Int. Cl.
| | | |
|---|---|---|
| *B24D 5/10* | (2006.01) | |
| *B23Q 11/12* | (2006.01) | |
| *B24B 55/02* | (2006.01) | |
| *B24D 7/10* | (2006.01) | |

(52) U.S. Cl.
CPC ............ *B24B 55/02* (2013.01); *B23Q 11/12* (2013.01); *B24D 5/10* (2013.01); *B24D 7/10* (2013.01)

(58) Field of Classification Search
CPC ....... B24B 55/02; B24B 55/03; B24B 55/045; B24D 5/10; B24D 7/10; B23Q 11/12; B23Q 11/126
USPC .............................. 451/53, 56, 449, 548, 488
See application file for complete search history.

(56) References Cited

U.S. PATENT DOCUMENTS

| | | | | |
|---|---|---|---|---|
| 1,928,314 A | * | 9/1933 | Koss .................. | B24D 7/00 451/548 |
| 2,087,012 A | * | 7/1937 | Zimmerman ......... | B24D 13/18 15/230.1 |
| 2,307,312 A | * | 1/1943 | Whiting .................. | B24D 7/10 451/548 |
| 2,470,350 A | | 5/1949 | Harrington | |
| 2,527,762 A | * | 10/1950 | Pratt .................. | B24D 9/08 15/230.1 |
| 2,599,952 A | * | 6/1952 | Strayer ............... | B23Q 11/005 451/449 |
| 2,697,878 A | | 12/1954 | Oberley | |
| 2,746,220 A | * | 5/1956 | Thomas .................. | B24D 7/10 451/449 |
| 3,110,993 A | | 11/1963 | Grage | |
| 3,161,995 A | * | 12/1964 | Lindblad ............... | B24D 7/10 451/449 |

(Continued)

FOREIGN PATENT DOCUMENTS

GB    2437933    11/2007

*Primary Examiner* — Eileen Morgan
(74) *Attorney, Agent, or Firm* — Norton Rose Fulbright Canada

(57) ABSTRACT

A method for distributing a coolant to a grinding site of a grinding wheel, including rotating the grinding wheel, injecting the coolant in an inlet of the grinding wheel disposed proximate to an axis of rotation of the grinding wheel, moving the coolant fluid from the inlet along a plurality of internal grooves of the grinding wheel outwardly towards a plurality of outlets, and expelling the coolant outwardly from the plurality of outlets at an angle of at most 15 degrees with respect to a tangent to a circumference of the grinding wheel at the outlet.

20 Claims, 8 Drawing Sheets

(56) References Cited

U.S. PATENT DOCUMENTS

| | | | | |
|---|---|---|---|---|
| 3,187,475 | A * | 6/1965 | Sopcak | B24D 9/085 451/488 |
| 3,483,858 | A | 12/1969 | Jansen | |
| 3,574,975 | A * | 4/1971 | Liss | B24B 55/02 451/449 |
| 3,579,928 | A * | 5/1971 | Held | B24D 7/10 451/488 |
| 3,872,630 | A * | 3/1975 | Ali | B24D 13/06 451/468 |
| 4,158,935 | A * | 6/1979 | Robert | B24D 9/08 451/359 |
| 4,193,228 | A | 3/1980 | Bowler | |
| 4,216,630 | A | 8/1980 | Smart et al. | |
| 4,791,760 | A | 12/1988 | Noll | |
| 5,111,624 | A | 5/1992 | Shoenhair et al. | |
| 5,259,148 | A | 11/1993 | Wiand | |
| 5,423,717 | A * | 6/1995 | Boaz | B24D 5/10 451/449 |
| 5,544,986 | A | 8/1996 | Kudo et al. | |
| 5,993,121 | A | 11/1999 | Fiesta | |
| 6,299,522 | B1 * | 10/2001 | Lee | B24B 55/102 451/488 |
| 6,312,325 | B1 * | 11/2001 | Van Osenbruggen | B24D 7/10 451/449 |
| 6,471,573 | B1 | 10/2002 | Reitmeyer | |
| D466,912 | S | 12/2002 | Lee | |
| 6,551,181 | B2 * | 4/2003 | Lee | B24D 7/06 451/548 |
| 6,739,960 | B2 | 5/2004 | Sauer | |
| 7,377,839 | B2 * | 5/2008 | Schrottner | B24D 5/10 451/450 |
| 7,582,004 | B2 | 9/2009 | Schwartz et al. | |
| 8,246,425 | B2 * | 8/2012 | Schudel | B24D 13/18 451/449 |
| 8,562,396 | B1 * | 10/2013 | Piliguian | B24D 9/08 125/15 |
| 2003/0143926 | A1 * | 7/2003 | Piliguian | B24B 23/02 451/6 |
| 2007/0128996 | A1 * | 6/2007 | Ficai | B24D 5/12 451/548 |
| 2012/0190279 | A1 * | 7/2012 | Ficai | B24D 5/10 451/442 |
| 2013/0052922 | A1 * | 2/2013 | Ahn | B24D 7/10 451/488 |

* cited by examiner

GRINDING WHEEL AND METHOD

CROSS-REFERENCE TO RELATED APPLICATIONS

This application is a divisional of U.S. application Ser. No. 14/159,121 filed Jan. 20, 2014, the entire contents of which are incorporated by reference herein.

TECHNICAL FIELD

The application relates generally to grinding wheels and, more particularly, to cooling in such grinding wheels.

BACKGROUND OF THE ART

When a grinding wheel grinds or machines a workpiece, heat is generated at the grinding zone. Coolant delivery to the machining zone ensures the extraction of heat, but also provides lubricity and allows for chip evacuation. Failure to deliver the required amount of coolant at the correct location may result in wheel failure and part damage, and may also cause equipment damage in case of fire when using oil based coolants. Superabrasive machining processes are particularly sensitive to coolant delivery, and coolant should be delivered as close as possible to the machining zone.

SUMMARY

In one aspect, there is provided a grinding wheel for grinding a workpiece through rotation at a predetermined rotational speed, the wheel comprising: a grinding wheel body having a hub defining a wheel inlet; and an impeller structure disposed within the wheel body around the hub, the impeller structure having a plurality of circumferentially spaced apart blades, the blades cooperating to define a plurality of grooves each extending between a groove inlet end in fluid communication with the wheel inlet and a groove outlet end adjacent an outer circumference of the impeller structure, wherein each groove is defined between first and second walls of adjacent one of the blades with the first wall being located in front of the second wall with respect to a direction of rotation of the wheel, and wherein an angle between the second wall adjacent the groove outlet and a tangent to the outer circumference adjacent the groove outlet is defined as $$\arctan\left(\frac{60Q\tan(a_2)}{2\pi R_2 A_2 N\tan(a_2) - 60Q}\right),$$

where Q is a desired flow rate of the coolant through the wheel, N is the predetermined rotational speed of the grinding wheel in $\min^{-1}$, $R_2$ is the radius of the outer circumference, $A_2$ is a combined surface area of the groove outlets, and $\alpha_2$ is a desired angle of exit of the coolant from the groove outlets with respect to the tangent to the outer circumference adjacent the groove outlet, a value for $\alpha_2$ being selected to be at most 15 degrees.

In another aspect, there is provided a grinding wheel for grinding a workpiece through rotation at a predetermined tangential speed, the wheel comprising: a grinding wheel body having a hub defining a wheel inlet; and an impeller structure disposed within the wheel body around the hub, the impeller structure having a plurality of circumferentially spaced apart blades, the blades cooperating to define a plurality of grooves each extending between a groove inlet end in fluid communication with the wheel inlet and a groove outlet end adjacent an outer circumference of the impeller structure, wherein each groove is defined between first and second walls of adjacent one of the blades with the first wall being located in front of the second wall with respect to a direction of rotation of the wheel, and wherein an angle between the second wall adjacent the groove outlet and a tangent to the outer circumference adjacent the groove outlet is defined as $$\arctan\left(\frac{\frac{Q}{A_2}}{U_2 - nU_2}\right),$$

where Q is a desired flow rate of the coolant through the wheel, $A_2$ is a combined surface area of the groove outlets, $U_2$ is the tangential speed of the grinding wheel, and n is at least 0.9 and less than 1.

In a further aspect, there is provided a method for distributing a coolant to a grinding site of a grinding wheel, the method comprising: rotating the grinding wheel; injecting the coolant in an inlet of the grinding wheel, the inlet being disposed proximate to an axis of rotation of the grinding wheel; moving the coolant fluid from the inlet along a plurality of internal grooves of the grinding wheel outwardly towards a plurality of outlets; and expelling the coolant outwardly from the plurality of outlets at an angle of at most 15 degrees with respect to a tangent to a circumference of the grinding wheel at the outlet.

DESCRIPTION OF THE DRAWINGS

Reference is now made to the accompanying figures in which.

DETAILED DESCRIPTION

A grinding wheel will be described herein. Such a grinding assembly may be used, for example, in machining of components of a gas turbine engine, including, but not limited to, turbine discs, integrally bladed rotors.

Conventional methods of coolant delivery usually rely on using external nozzles to bring coolant into the machining zone in a spraying technique. Such a technique may be limited to having a clear line of sight from nozzle orifice to the machining zone. In case of grinding of internal part features, the line of sight is often blocked and it may require a complicated nozzle design to reach the machining zone; the nozzle may also provide interference in the tool path to avoid collision with the part. Accordingly, a grinding wheel providing internal coolant delivery is described herein.

Figure 1:
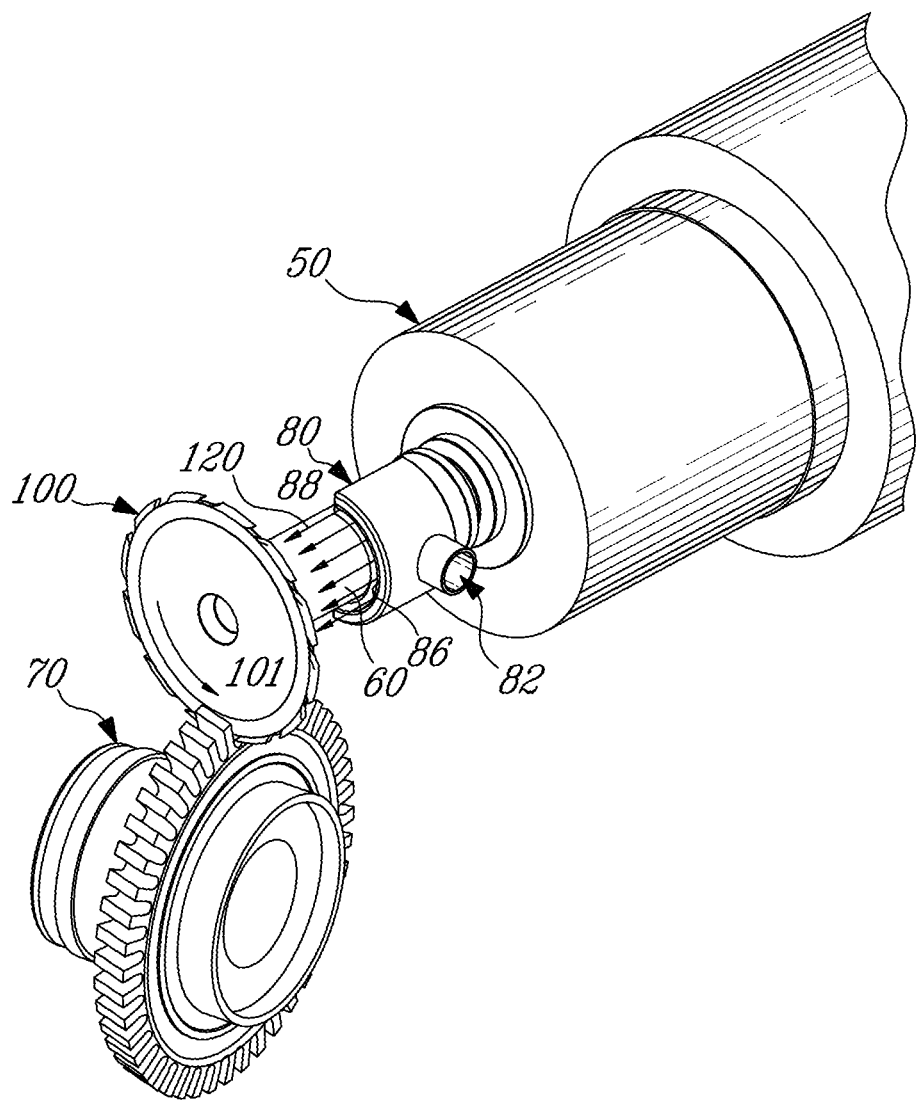
FIG. 1 is a perspective view of a grinding wheel with a coolant nozzle according to a particular embodiment, shown grinding a static workpiece.
Figure 2:
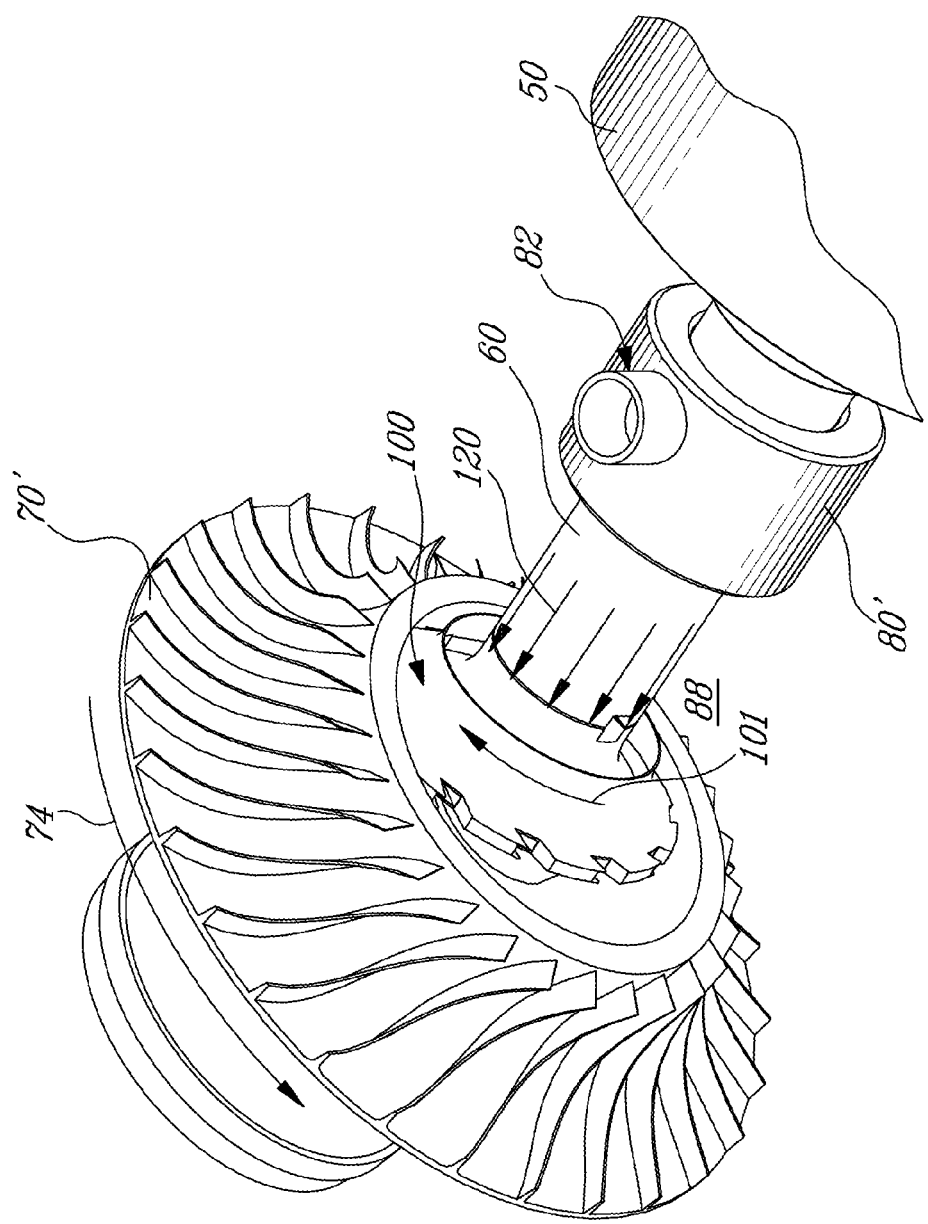
FIG. 2 is a perspective view of the grinding wheel of FIG. 1 with a coolant nozzle according to another embodiment, shown grinding a rotating workpiece.

Referring to FIGS. 1 to 4, the grinding wheel 100 is shown connected to a machine spindle 50 by a rotatable shaft 60. The shaft 60 entrains the grinding wheel 100 in rotation for grinding and machining a workpiece 70. The shaft 60 is powered by a motor (not shown) which drives the shaft 60 at an appropriate speed for grinding, for example a wheel surface speed in the range of 2000 to 25000 sfm (surface feet per minute). In a particular embodiment, the shaft 60 and grinding wheel 100 rotate at about 5000 rotations/min. Arrow 101, shown in FIGS. 1 and 2, represents a direction of rotation of the grinding wheel 100. In the embodiment shown in FIG. 1, the workpiece 70 is a turbine disc and the grinding wheel 100 grinds fir-tree slots of the turbine disc. It is contemplated that the grinding wheel 100 could be used to grind or machine other three-dimensional pieces. Also, in the embodiment shown in FIG. 1, the workpiece 70 is static during the grinding operation. However, it is contemplated that the workpiece could be mobile. FIG. 2 provides such an example, where the grinding wheel 100 operates on a rotating workpiece 70' such as an integrally bladed rotor, rotating in the direction shown by arrow 74.

FIGS. 1 and 2 show two embodiments of coolant nozzles 80, 80' providing coolant to the grinding and machining site. The coolant nozzles 80, 80' function in association with the grinding wheel 100 to circulate coolant through the grinding wheel 100 to reach the grinding site. The coolant nozzles 80, 80' are arcuate, extend around the shaft 60, and are fixedly connected to the machine spindle 50. In FIG. 2, the coolant nozzle 80' completely surrounds the shaft 60, while the coolant nozzle 80 shown in FIG. 1 surrounds only a portion of the shaft 60. More specifically, the coolant nozzle 80 is in the shape of a half-ring and covers only half of a circumference of the shaft 60. It is contemplated however that the coolant nozzle 80 could cover other fractions of the circumference of the shaft 60. For example, the coolant nozzle 80 could cover only ⅓ or only ¾ of the circumference of the shaft 60. The internal structure of the coolant nozzle 80' is similar to that of the coolant nozzle 80, and accordingly both will be described together herein.

Figure 3:
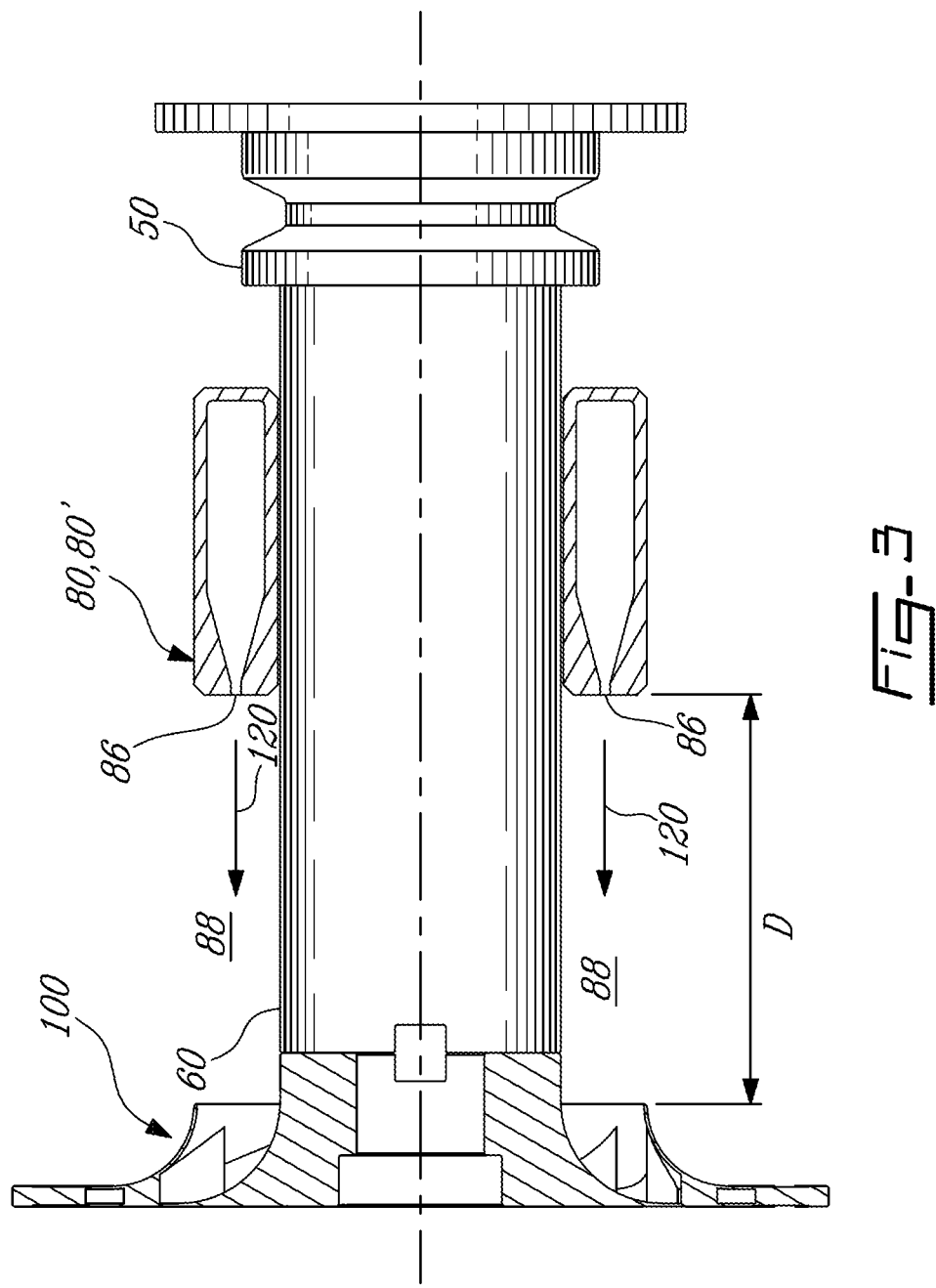
FIG. 3 is a cross-sectional view of the grinding wheel, the coolant nozzle, the rotating shaft and the machine spindle of FIG. 2.

Referring to FIG. 3, the coolant nozzle 80, 80' is disposed at a distance D from the grinding wheel 100. The distance D is selected such as to limit or prevent dispersion of the coolant traveling around the shaft 60 before reaching the grinding wheel 100, and to allow sufficient space to avoid interference between the nozzle and the workpiece being machined. In a particular embodiment, a same distance D is kept for grinding wheel assemblies 100 having different sizes; this may help facilitate interchangeability of the wheel assemblies. Referring back to FIGS. 1-2, the coolant nozzle 80, 80' includes an inlet 82 which receives a coolant fluid (not shown) delivered by a coolant supply pump (not shown). In a particular embodiment, the coolant fluid is a mixture of oil and air. Alternately, it is contemplated that the coolant fluid could be only water, or only oil, or any other appropriate coolant liquid such as for example a water soluble coolant; the coolant may be natural or synthetic. The coolant is expelled through an arcuate orifice 86 (annular for the nozzle 80' of FIG. 2) on a side of the nozzle 80 facing the grinding wheel 100. It can be seen from FIG. 3 that the internal walls of the nozzle 80, 80' converge to the relatively narrow orifice 86; in a particular embodiment, such a configuration helps converge the coolant flow into an arcuate or annular film which may flow to the grinding wheel 100 without or with little dispersion. Other configurations are also possible. Arrows 88 illustrate the coolant being expelled by the coolant nozzle 80, 80' in a direction of the grinding wheel 100. It is contemplated that coolant could be delivered by way other than the arcuate orifice 86. For example, the coolant nozzle 80, 80' could include a plurality of circumferentially spaced apart orifices. The coolant is provided to the grinding wheel 100 externally of the shaft 60.

Figure 4:
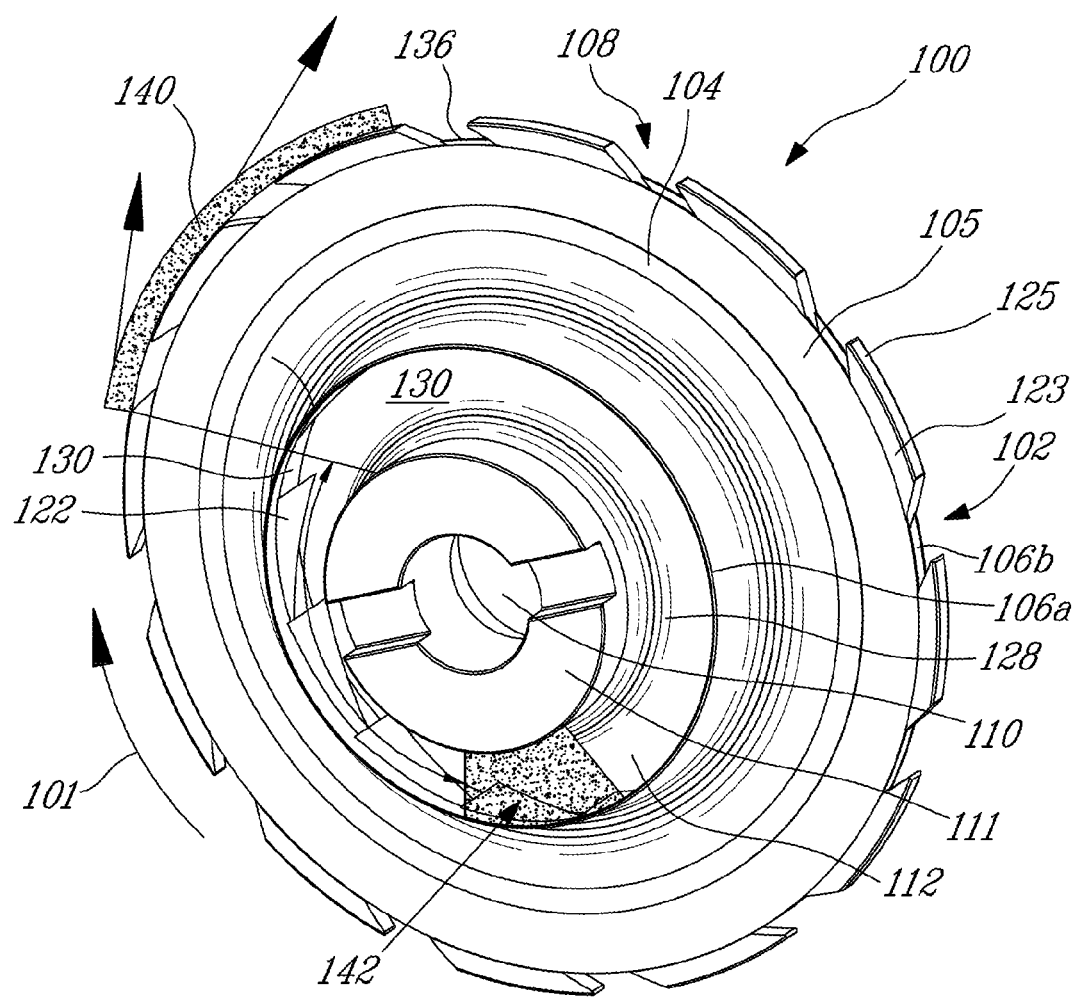
FIG. 4 is a rear perspective view of the grinding wheel of FIGS. 1-2.

Turning now to FIGS. 4 to 7, the grinding wheel 100 includes a body 102 having front and rear walls 104, 106 facing each other, and an impeller structure 108 extending between and connected to the front and rear walls 104, 106. The body 102 includes a central portion or hub 111 having a central bore 110 defined therethrough along a longitudinal rotational axis 90 (shown in FIG. 7) of the body 102. As shown in FIG. 4, the hub 111 defines an attachment around the central bore 110 for connecting with the rotating shaft 60 when received within the central bore 110.

In a particular embodiment, the body 102 and impeller structure 108 are made of metal including, but not limited to, one of steel, aluminium and titanium, and integrally formed (i.e. it is a monolithic piece). It is contemplated that the body 102 and impeller structure 108 could be made of an appropriate material other than metal, including, but not limited to, one of carbon fiber and glass reinforced nylon. In a particular embodiment, the body 102 and impeller structure 108 are made by additive manufacturing. Examples of additives manufacturing include selective laser sintering, fused deposition molding or direct metal laser sintering.

It is also contemplated that the front and rear walls 104, 106 and impeller structure 108 could be separately manufactured and interconnected through any appropriate method. Other suitable methods of manufacturing the grinding wheel 100 include, but are not limited to, casting methods such as sand casting, die casting, investment casting or metal injection molding.

Figure 5:
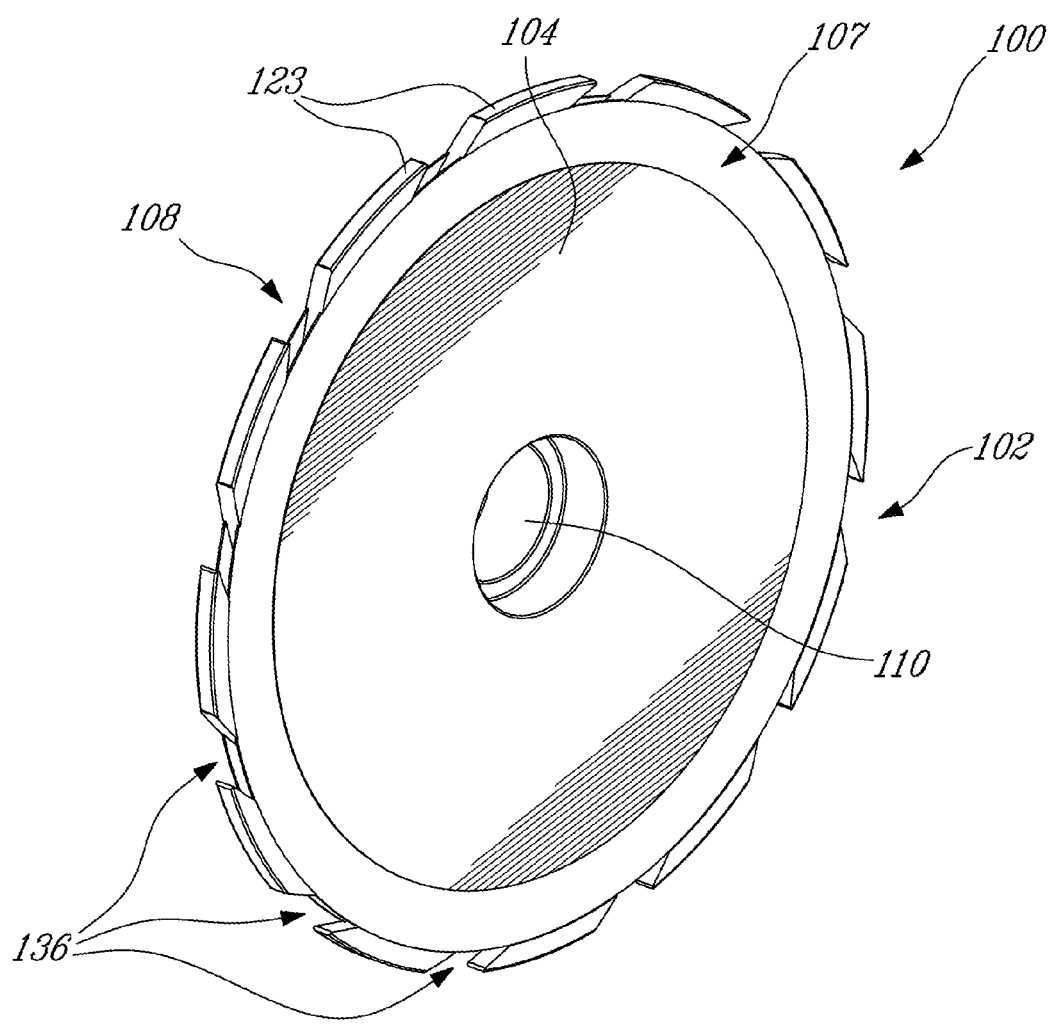
FIG. 5 is a front perspective view of the grinding wheel.
Figure 6:
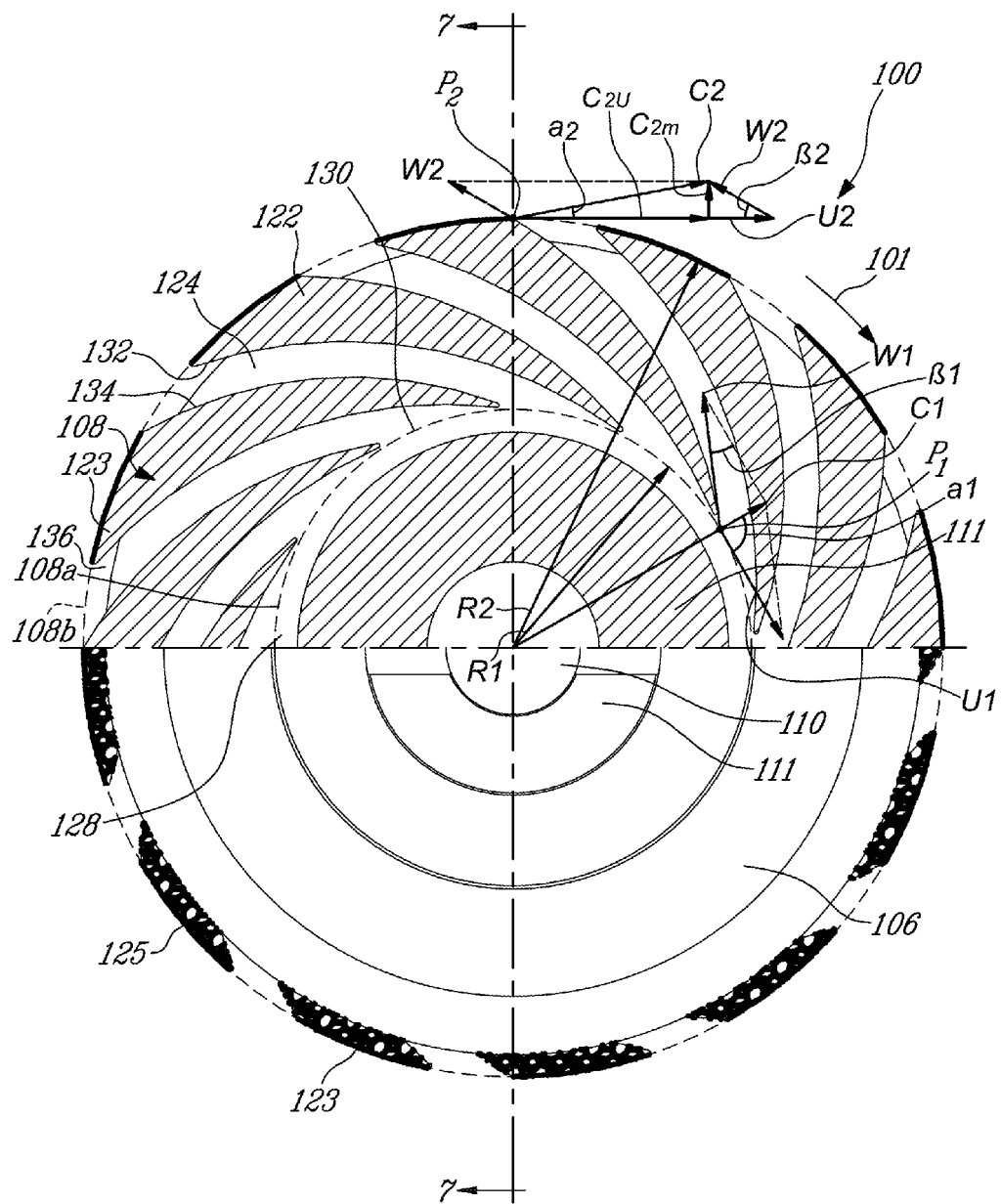
FIG. 6 is a rear elevation view of the grinding wheel shown partially cut-out to reveal an internal impeller structure, with the partial cross-section being taken along line 6-6 of FIG. 7.
Figure 7:
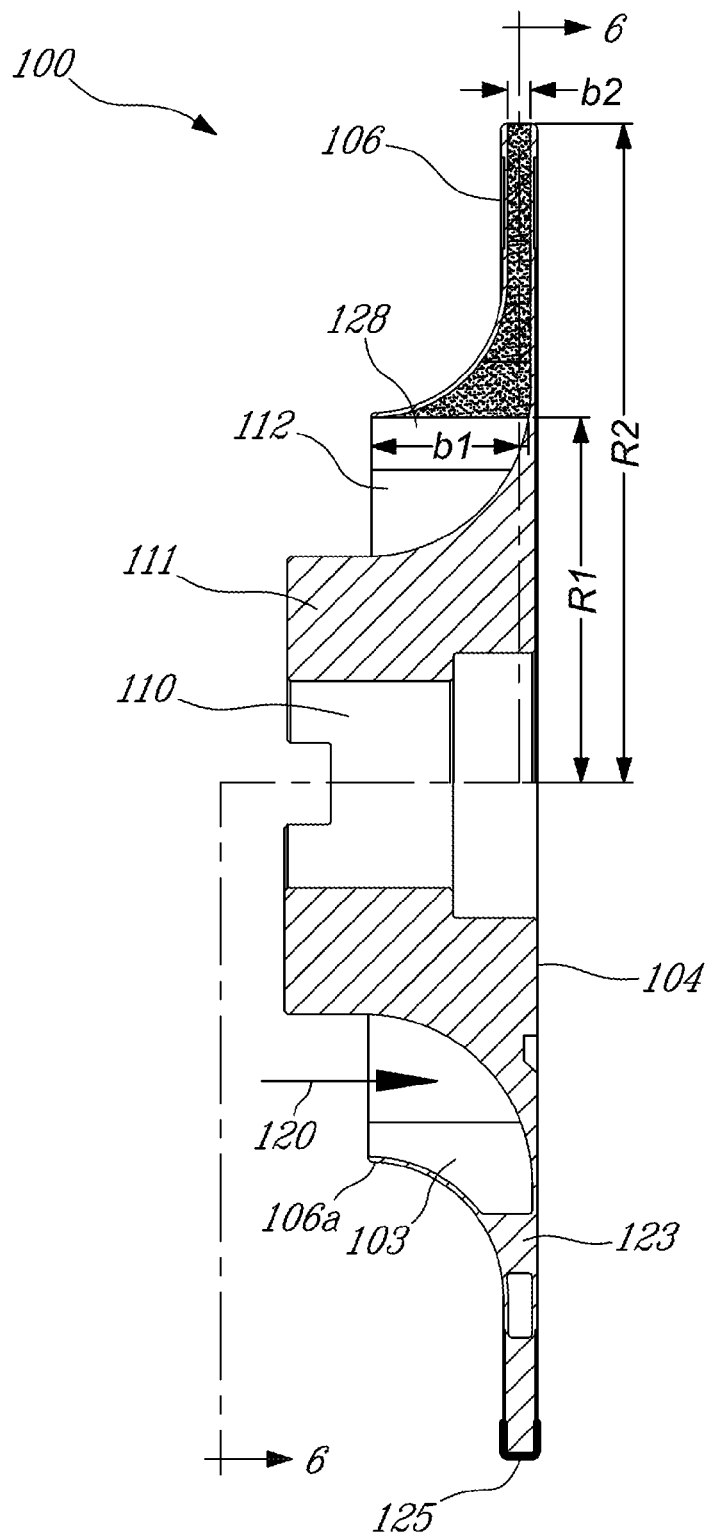
FIG. 7 is a cross-sectional view of the grinding wheel taken along line 7-7 of FIG. 6.
Figure 8:
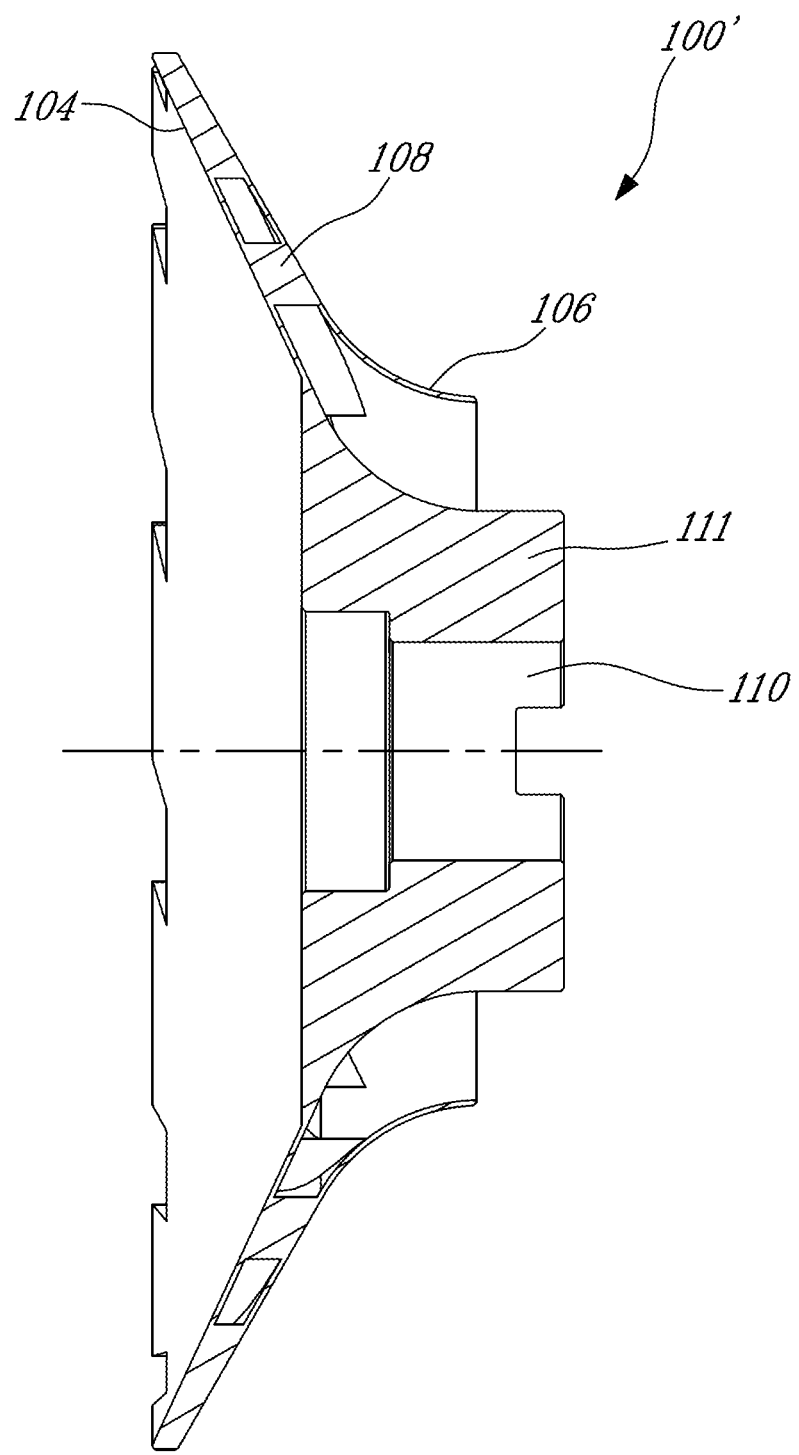
FIG. 8 is side cross-sectional view of a grinding wheel according to another embodiment.

In the embodiment shown in FIGS. 4 to 7, and as can be particularly seen in FIG. 7, the grinding wheel 100 is generally flat; the front wall 104 has a flat radial orientation, while the rear wall 106 has a flat, radially oriented outer annular section connected to a curved inner annular section such that the inner end of the rear wall 106 is axially or substantially axially oriented. It is contemplated however that the grinding wheel 100 could have another shape depending on the geometrical features that are required to be machined and on the targeted metal removal rate. For example, as shown in FIG. 8, a grinding wheel 100' in accordance with an alternate embodiment has a generally cup shape, with a semi-axial impeller structure 108. The grinding wheel 100' having a structure similar to the grinding wheel 100 besides its general curvature, it will not be described in detail herein.

Referring back to FIG. 7, the rear wall 106 faces the coolant nozzle 80, 80'. The inner end 106a of the rear wall 106 extends around and spaced apart from the hub 111, with the annular, open space between the hub 111 and the inner end 106a defining an inlet 112 for the coolant. The inlet 112 is aligned with the coolant nozzle 80, 80' to receive the coolant expelled by the coolant nozzle 80, 80'. The inlet 112 is a point of entry of the coolant to an inside of the grinding wheel 100 and to the impeller structure 108.

The outer surface of the hub 111 curves outwardly such as to merge with the front wall 104, while remaining inwardly spaced apart from the curved inner annular section of the rear wall 106. This curvature forms a funnel 103 which guides the coolant entering the inlet 112 and redirects the coolant from an axial flow 120 to a flow $W_2$ relative to the wheel 100 (FIG. 6) having a radial and a circumferential component (to be further detailed below).

In a particular embodiment and as can be seen in FIGS. 4-5, the rear wall 106 includes an annular recess 105 defined therein, adjacent its outer circumference 106b, and the front wall 104 further includes an annular recess 107 defined therein, adjacent an outer circumference thereof similar to the recess 105 of the rear wall 106. In a particular embodiment, the recesses 105, 106 may be helpful in reaching the machined surface of the workpiece 70, 70' without interference from the other sections of the workpiece, and/or decrease rubbing with these other sections. It is contemplated that one or both of the recesses 104, 105 could be omitted.

Referring more specifically to FIG. 6, the impeller structure 108 shown has a radial design, but alternate configurations are also possible. The impeller structure 108 includes a plurality of regularly circumferentially spaced apart curved blades 122 extending between and interconnecting the front and rear walls 104, 106. The blades 122 extend between an inner circumference 108a at a radius $R_1$ and an outer circumference 108b at a radius $R_2$. The blades 122 may connect with the annular hub 111 along the front wall 104 (see FIG. 7). However, spaced from the front wall 104, an annular passage 128 is defined between the blades 122 and the hub 111, the annular passage 128 being in fluid communication with the inlet 112. The blades 122 are curved in a direction opposite to the direction of rotation 101 of the grinding wheel 100.

The blades 122 extend outwardly beyond the front and rear walls 104, 106. Portions 123 of the blades 122 extending beyond the front and rear walls 104, 106 are coated by an abrasive layer 125. The portions 123 are the elements of the grinding wheel 100 which effectively grinds the workpiece 70, 70'. In a particular embodiment, the coating layer 125 is superabrasive and is made of cBN. It is contemplated that the coating layer 125 could be abrasive yet not super abrasive and could be made of a superabrasive material other than cBN. For example, the coating layer 125 could be made of diamond vitrified material or resin bonded abrasive such as for example aluminium oxide or silicon carbide. In a particular embodiment, the coating is applied using single layer electroplating. It is contemplated that other coating techniques could be used to coat the portions 123 with the abrasive layers 125. For example, brazing could be used. It is contemplated that the abrasive layer 125 could be connected to the portion 123 of the grinding wheel 100 subject to machining by methods other than coating. For example, the abrasive layers 125 could be assembled or bonded to the portions 123.

The circumferentially spaced blades 122 define a plurality of grooves 124 therebetween, each extending from and communicating with the annular passage 128. Each of the grooves 124 is defined by a first blade wall 132 belonging to a first blade 122, and a second blade wall 134 belonging to a second blade 122 adjacent to the first blade 122. Accordingly, the groove 124 is bounded by the first and second blade walls 132, 134, with the first blade wall 132 being disposed in front of the second blade wall 134 with respect to the direction of rotation, i.e. the first blade wall 132 is the first one to pass a fixed point when the wheel 100 is rotating, and the second blade wall 134 "pushes" the coolant in the circumferential direction as the wheel 100 rotates. The first and second blade walls 132, 134 allow the coolant to be directed to the grinding site.

Referring to FIG. 7, as the coolant is introduced through the inlet 112, it flows into the annular passage 128 and is then diverted radially due to impact on the hub 111 and to the funnel 103. The centrifugal force generated by the rotation of the grinding wheel 100 forces the coolant to flow from the annular passage 128 to the inlet 130 of each of the grooves 124, located along the inner circumference 108a and between the first and second blade walls 132, 134 of a given groove 124. The coolant travels along the groove 124, which is bounded by the first and second blade walls 132, 134, and exits at the groove outlet 136, located along the outer circumference 108b and between the first and second blade walls 132, 134 of the groove 124. A curvature of the blades 122 is determined to shape the grooves 124 to enable the coolant to exit the impeller structure 108 at a specific speed and direction to favor coolant delivery to the grinding site, using the centrifugal force generated by the rotation of the grinding wheel 100.

Although the groove inlets 130 are shown as communicating with the wheel inlet 112 through the annular passage 128, it is understood that other types of communications may be provided, including, but not limited to, each groove inlet 130 separately communicating with the wheel inlet 112. In the embodiment shown, the grooves 124 have a curved shape with the outlet 136 of each groove 124 being circumferentially offset from the inlet 130 of the groove in a direction opposite the direction of rotation of the wheel 100.

In a particular embodiment, velocity triangles can be used to estimate coolant flow at the groove inlets 130 and outlets 136. Coolant absolute velocity C can be calculated as the sum of a relative velocity W of the coolant with respect to the wheel 100 and a tangential velocity U of the wheel 100 or impeller structure 108. Still referring to FIGS. 6-7, focusing on the groove inlet 130, a point $P_1$ is defined at an intersection of the first blade wall 132 and the corresponding groove inlet 130 of a given groove 124. The entire coolant flow Q passes through an area $A_1$ of the combined groove inlets 130. With a radial impeller structure 108 such as in FIG. 6-7, the combined area $A_1$ of the groove inlets 130 may be determined by $$A_1 = 2\pi R_1 b_1$$

with $R_1$ being the radial position of the groove inlet 130, and $b_1$ the axial dimension of the blade 122 at the inlet 130 (see FIG. 7). Assuming no coolant rotation at the inlet 112, the coolant absolute velocity $C_1$ at the groove inlet 130 is expressed by $$C_1 = \frac{Q}{A_1}$$

and the tangential velocity $U_1$ of the impeller structure 108 at the groove inlet 130 is expressed by $$U_1 = 2\pi R_1 \frac{N}{60}$$

where N is the rotational speed of the grinding wheel 100 in $\min^{-1}$.

Assuming no coolant rotation at the groove inlet 130, an angle $\alpha_1$ between the tangential velocity $U_1$ of the impeller 108 and the absolute coolant velocity $C_1$ is 90°, and a relative flow angle $\beta_1$ between the relative coolant velocity $W_1$ and the absolute coolant velocity $C_1$ at the groove inlet 130 can be calculated from $$\tan(\beta_1) = \frac{C_1}{U_1}$$

Focusing now on the groove outlet 136, point $P_2$ is defined at an intersection of the second blade wall 134 (the "pushing wall") and the groove outlet 136. At the groove outlet 136, an absolute coolant velocity $C_2$ as well as a relative coolant velocity $W_2$ (relative to the rotating wheel 100) may be determined. The absolute coolant velocity $C_2$ may be split into a tangential absolute coolant velocity component $C_{2U}$, representing the component of the absolute coolant velocity extending along a tangential direction of the wheel 100 and accordingly parallel to the tangential velocity $U_2$ of the wheel, and a transverse absolute coolant velocity component $C_{2m}$ which extends perpendicularly to $C_{2U}$. The transverse absolute coolant velocity component $C_{2m}$ can be calculated from $$C_{2m} = \frac{Q}{A_2} \quad \text{[equation A]}$$

where $A_2$ is the combined area of the groove outlets 136, which can be calculated as $$A_2 = 2\pi R_2 b_2 f$$

where $R_2$ is the radial position of the groove outlet 136, $b_2$ the axial dimension of the blade 122 at the groove outlet 136 (see FIG. 7), and f a ratio between a total of the circumferential dimensions $l_2$ of the groove outlets 136 over the outer circumference 108$b$. In a particular embodiment, the combined area $A_2$ of the groove outlets 136 is smaller than the combined area $A_1$ of the groove inlets 130.

It can be seen from FIG. 6 than an angle $\alpha_2$ may be defined between the absolute coolant velocity $C_2$ at the outlets 136 and the tangential direction of the wheel 100; this angle is referred herein as the angle of exit of the coolant flow. This angle is determined by a number of parameters, one of which being the angle $\beta_2$ between the second wall 134 of the groove at the outlet 136 and the tangential direction. As the relative flow of coolant is determined by the orientation of this "pushing wall" 134, the angle $\beta_2$ can also be found between the relative coolant velocity $W_2$ at the outlet 136 and the tangential direction.

In a particular embodiment, the angle $\beta_2$ is selected such as to have a value for the angle of exit of the coolant flow $\alpha_2$ between 0 and 15 degrees; in a particular embodiment, having the absolute coolant velocity $C_2$ as close as possible to the tangential direction may help the coolant to go through the air barrier created as the grinding wheel 100 rotates. The angle $\beta_2$ may thus be expressed as a function of the angle of exit of the coolant flow $\alpha_2$.

By definition, the tangential absolute coolant velocity component $C_{2U}$ at the outlet 136 may be expressed as $$C_{2u} = \frac{C_{2m}}{\tan \alpha_2} \quad \text{[equation B]}$$

and the tangential velocity $U_2$ of the wheel 100 at the outlet 136 may be expressed as $$U_2 = 2\pi R_2 \frac{N}{60} \quad \text{[equation C]}$$

where $R_2$ is the radial position of the groove outlet 136 and N is the rotational speed of the grinding wheel 100 in min$^{-1}$.

The tangential absolute coolant velocity component $C_{2U}$ may also be expressed as a function of the tangential velocity $U_2$ of the wheel 100 at the outlet 136 as $$C_{2U} = U_2 - \frac{C_{2m}}{\tan \beta_2}. \quad \text{[equation D]}$$

By combining equations B and D above:

$$\frac{C_{2m}}{\tan \alpha_2} = U_2 - \frac{C_{2m}}{\tan \beta_2}. \quad \text{[equation E]}$$

Then, by combining equation E with equations A and C above:

$$\frac{Q}{A_2}\left(\frac{1}{\tan(\alpha_2)} + \frac{1}{\tan(\beta_2)}\right) = 2\pi R_2 \frac{N}{60} \quad \text{[equation F]}$$

$$\Leftrightarrow \frac{1}{\tan(\beta_2)} = \frac{2\pi R_2 A_2 N}{60Q} - \frac{1}{\tan(\alpha_2)}$$

$$\Leftrightarrow \tan(\beta_2) = \frac{60Q\tan(\alpha_2)}{2\pi R_2 A_2 N \tan(\alpha_2) - 60Q}$$

$$\Leftrightarrow \beta_2 = \arctan\left(\frac{60Q\tan(\alpha_2)}{2\pi R_2 A_2 N \tan(\alpha_2) - 60Q}\right)$$

Accordingly, by using the maximum value for the desired angle of exit of the coolant flow $\alpha_2$ in equation F above, the value of the angle $\beta_2$ between the second wall 134 of the groove at the outlet 136 and the tangential direction may be found. In a particular embodiment, a value of at most 15 degrees for the desired angle of exit of the coolant flow $\alpha_2$ is used. In another particular embodiment, a value of at most 10 degrees for the desired angle of exit of the coolant flow $\alpha_2$ is used. In another particular embodiment, a value of at most 5 degrees for the desired angle of exit of the coolant flow $\alpha_2$ is used.

Alternately or in addition, the value of the angle $\beta_2$ between the second wall 134 of the groove at the outlet 136 and the tangential direction may be determined based on a desired value for the tangential absolute coolant velocity component $C_{2U}$, as a portion of the value to the tangential speed $U_2$ of the grinding wheel 100, i.e. to have $$C_{2U} = nU_2 \quad \text{[equation G]}$$

where in a particular embodiment n is as close as possible to 1.

In a particular embodiment, the wheel 100 is configured to obtain a value of the tangential absolute coolant velocity component $C_{2U}$ being at least 90% of the tangential speed $U_2$ of the grinding wheel 100, i.e. with n being at least 0.9. In a particular embodiment, n is less than 1. Accordingly, in a particular embodiment, $0.9 \leq n < 1$. From equation D above, we can define the value of the angle $\beta_2$ between the second wall 134 of the groove at the outlet 136 and the tangential direction as $$\beta_2 = \arctan\left(\frac{C_{2m}}{U_2 - C_{2U}}\right).\quad\text{[equation H]}$$

By combining equations A and G into equation H, we find $$\beta_2 = \arctan\left(\frac{\frac{Q}{A_2}}{U_2 - nU_2}\right)\quad\text{[equation I]}$$

Accordingly, by using a desired value of n in equation I above, the value of the angle $\beta_2$ between the second wall 134 of the groove at the outlet 136 and the tangential direction may be found. As mentioned above, in a particular embodiment, a value of n of at least 0.9 is used. In a particular embodiment, a value of $0.9 \le n < 1$ is used.

In a particular embodiment, the angle $\beta_2$ is found using equation F above, and then the tangential absolute coolant velocity component $C_{2U}$ is calculated to verify that it is at least a given proportion of the tangential speed $U_2$ of the grinding wheel 100, for example at least 90%. In another particular embodiment, the angle $\beta_2$ is found using equation I above, and then the angle of exit of the coolant flow $\alpha_2$ is calculated to verify that is it smaller than or equal to a maximum predetermined value, for example 15 degrees.

In a particular embodiment, the angle between the first wall 132 of the groove at the outlet 136 and the tangential direction is also defined by $\beta_2$.

Turning back to FIG. 4, the coolant delivery through the grinding wheel 100 using the coolant nozzle 80 of FIG. 1, extending around only part of the circumference of the shaft 60, may be targeted to obtain coolant delivery out of the outlets 136 along only a desired circumferential location. When using a coolant nozzle which provides coolant to only a portion of the inlet 112, there exists an angular shift $\phi$ between a portion 142 of the inlet 112 (shown with shading) receiving the coolant and a portion 140 of the outlet 136 (shown with shading) through which the coolant is expelled. The angular shift $\phi$ is function of a rotational speed $\omega$ of the grinding wheel 100, and of a time T taken by the coolant to flow between the inlet 112 and the outlet 136:

$$\phi = \omega T$$

The time T is function of the average velocity $W_{avg}$ of the coolant relative to the grinding wheel 100, and of a distance L (not shown) traveled inside the impeller structure 108:

$$T = \frac{L}{W_{avg}}$$

In a particular embodiment, $W_{avg}$ is calculated as the average between the relative coolant velocity $W_2$ at the outlet 136 and the relative coolant velocity $W_1$ at the inlet 130, and the distance L is measured as the length of a center line of one of the grooves 124. Accordingly, in a particular embodiment, the angular shift $\phi$ is calculated, and the circumferential position of the nozzle 80 is then selected to be at the angle $\phi$ with respect to the circumferential location where contact between the wheel 100 and the workpiece 70, 70' occurs, such that coolant may be delivered where it is required. Accordingly, in a particular embodiment, the partial nozzle 80 may help minimize coolant waste.

In use, the grinding wheel 100 is rotated about its rotational axis 90. The motor rotates the shaft 60 which in turns rotates the grinding wheel 100. The coolant is then injected into the inlet 112 of the grinding wheel 100 by the coolant nozzle 80. In a particular embodiment, the airflow created through the grooves 124 by the rotation of the wheel 100 produces a "sucking" force which helps to drive the coolant to the inlet 112 of the grinding wheel.

As the coolant reaches the funnel 103, it is directed to the annular passage 128 toward the groove inlets 130. The second blade wall 134 pushes circumferentially on the coolant travelling radially, and directs the coolant toward the groove outlets 136. As it rotates, the impeller structure 108 transfers energy to the coolant. Because the impeller structured 108 is enclosed by the front and rear walls 104, 106 of the body 102, the impeller blades 122 transfer mechanical energy from the spindle to the coolant, which is converted to internal energy by increasing coolant static pressure and to kinetic energy by increasing coolant velocity. Having the combined groove outlet area $A_2$ smaller than the combined groove inlet area $A_1$ may contribute to the coolant being accelerated from the groove inlets 130 to the groove outlets 136.

The coolant is then expelled from the plurality of groove outlets 136 at the angle of exit $\alpha_2$ (i.e. angle between the absolute coolant velocity at the outlet $C_2$ and the tangential direction of the grinding wheel 100 at the outlet 136), which in a particular embodiment is at most 15 degrees. In a particular embodiment, the coolant is alternately or also expelled from the plurality of groove outlets 136 such that the tangential absolute coolant velocity component $C_{2U}$ at the outlet 136 is at least a 90% of the tangential speed $U_2$ of the grinding wheel 100.

Although the method is described for the grinding wheel 100 and the coolant nozzle 80, it is should be understood that the method could be used on any alternate embodiment of the grinding wheel and the coolant nozzle.

In a particular embodiment, the internal centrifuge assisted coolant delivery through the impeller structure 108 may allow to grind or machine a workpiece having various shapes and dimensions including those which have no line of sight while delivering coolant at the grinding zone. In addition, in a particular embodiment, the grinding wheel 100 may allow coolant delivery for various sizes, shapes or extensions of a machine spindle and a delivery of the coolant in a near proximity of the grinding or machining zone. In a particular embodiment, the impeller structure 108 allows to deliver coolant close to a tangent to the grinding wheel 100 and as close as possible to the machining zone, and allows to have a coolant speed close to the grinding wheel circumferential surface speed to overcome the air barrier that usually forms around the grinding wheel.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method for distributing a coolant to a grinding site of a grinding wheel, the method comprising:
   rotating the grinding wheel;
   injecting the coolant in an inlet of the grinding wheel, the inlet being disposed proximate to an axis of rotation of the grinding wheel;
   moving the coolant fluid from the inlet along a plurality of internal grooves of the grinding wheel outwardly towards a plurality of outlets; and
   expelling the coolant outwardly from the plurality of outlets at an absolute coolant velocity, the absolute coolant velocity oriented at an angle of at most 15 degrees with respect to a tangent to a circumference of the grinding wheel at the outlet.

2. The method as defined in claim 1, wherein expelling the coolant outwardly from the plurality of outlets is performed with the angle with respect to the tangent to the circumference of the grinding wheel being at most 10 degrees.

3. The method as defined in claim 1, wherein expelling the coolant outwardly from the plurality of outlets is performed with the angle with respect to the tangent to the circumference of the grinding wheel being at most 5 degrees.

4. The method as defined in claim 1, wherein expelling the coolant outwardly from the plurality of outlets includes expelling the coolant with an absolute tangential speed at in a range of between 90 and 100% of a tangential velocity of the grinding wheel.

5. The method as defined in claim 1, further comprising:
   determining an angular shift of the coolant from a rotational speed of the grinding wheel and a time taken by the coolant to flow through the plurality of grooves to the outlets;
   determining a location of contact between the grinding wheel and a workpiece; and
   injecting the coolant in the inlet is performed along only a portion of a circumference of the grinding wheel, the portion being circumferentially offset from the location of contact by the angular shift.

6. The method as defined in claim 1, wherein moving the coolant fluid from the inlet along the plurality of internal grooves is performed in each of the grooves along a curved shape, the coolant fluid moving from a respective groove inlet to a respective one of the outlets being circumferentially offset from the respective groove inlet in a direction opposite the direction of rotation of the wheel.

7. The method as defined in claim 1, comprising moving the coolant from the inlet of the grinding wheel along an annular passage of the grinding wheel before moving the coolant fluid along the plurality of internal grooves.

8. The method as defined in claim 1, wherein injecting the coolant in the inlet of the grinding wheel is performed through a coolant nozzle extending around a rotatable support member connected to the grinding wheel.

9. The method as defined in claim 8, wherein the coolant flows through the coolant nozzle around only part of a circumference of the support member.

10. A method for distributing a coolant to a grinding site of a grinding wheel, the method comprising:
    rotating the grinding wheel;
    injecting the coolant in an inlet of the grinding wheel, the inlet being disposed proximate to an axis of rotation of the grinding wheel;
    moving the coolant fluid from the inlet along a plurality of internal grooves of the grinding wheel outwardly towards a plurality of outlets; and
    expelling the coolant outwardly from the plurality of outlets at an angle of at most 15 degrees with respect to a tangent to a circumference of the grinding wheel at the outlet;
    wherein each of the internal grooves is defined between first and second walls with the first wall being located in front of the second wall with respect to a direction of rotation of the wheel, and wherein an angle between the second wall adjacent a respective one of the outlets and the tangent to the outer circumference adjacent the respective one of the outlets is defined as:

$$\arctan\left(\frac{60Q\tan(a_2)}{2\pi R_2 A_2 N\tan(a_2) - 60Q}\right)$$

where Q is a flow rate of the coolant through the grinding wheel,
N is a predetermined rotational speed of the grinding wheel in $\min^{-1}$,
$R_2$ is the radius of the outer circumference,
$A_2$ is a combined surface area of the plurality of outlets, and
$\alpha_2$ is the angle of the coolant expelled outwardly from the plurality of outlets with respect to the tangent to the circumference of the grinding wheel at the outlet.

11. The method as defined in claim 10, wherein the angle between the second wall adjacent the respective one of the outlets and the tangent to the outer circumference adjacent the respective one of the outlets is also defined as $$\arctan\left(\frac{\frac{Q}{A_2}}{U_2 - nU_2}\right)$$

where $U_2$ is a tangential speed of the grinding wheel, and n is at least 0.9 and less than 1.

12. The method as defined in claim 10, wherein a combined surface area of the inlets of the grooves is greater than the combined surface area of the plurality of outlets $A_2$.

13. The method as defined in claim 10, wherein expelling the coolant outwardly from the plurality of outlets is performed with the angle with respect to the tangent to the circumference of the grinding wheel being at most 10 degrees.

14. The method as defined in claim 10, wherein expelling the coolant outwardly from the plurality of outlets is performed with the angle with respect to the tangent to the circumference of the grinding wheel being at most 5 degrees.

15. The method as defined in claim 10, wherein expelling the coolant outwardly from the plurality of outlets includes expelling the coolant with an absolute tangential speed at in a range of between 90 and 100% of a tangential velocity of the grinding wheel.

16. The method as defined in claim 10, further comprising:
    determining an angular shift of the coolant from a rotational speed of the grinding wheel and a time taken by the coolant to flow through the plurality of grooves to the outlets;
    determining a location of contact between the grinding wheel and a workpiece; and
    injecting the coolant in the inlet is performed along only a portion of a circumference of the grinding wheel, the portion being circumferentially offset from the location of contact by the angular shift.

17. The method as defined in claim 10, wherein moving the coolant fluid from the inlet along the plurality of internal grooves is performed in each of the grooves along a curved shape, the coolant fluid moving from a respective groove inlet to a respective one of the outlets being circumferentially offset from the respective groove inlet in a direction opposite the direction of rotation of the wheel.

18. The method as defined in claim 10, comprising moving the coolant from the inlet of the grinding wheel along an annular passage of the grinding wheel before moving the coolant fluid along the plurality of internal grooves.

19. The method as defined in claim 10, wherein injecting the coolant in the inlet of the grinding wheel is performed through a coolant nozzle extending around a rotatable support member connected to the grinding wheel.

20. The method as defined in claim 19, wherein the coolant flows through the coolant nozzle around only part of a circumference of the support member.

* * * * *